UNITED STATES PATENT OFFICE.

DANDRIDGE H. BIBB, OF NEW YORK, N. Y., ASSIGNOR TO CONTINENTAL PROCESS CORPORATION, OF BRIARCLIFF VILLAGE, NEW YORK, A CORPORATION OF NEW YORK.

BRIQUETS AND OTHER PRODUCT COMPOSED OF BONDED DIVIDED MATERIAL.

1,158,365.  Specification of Letters Patent.  Patented Oct. 26, 1915.

No Drawing.  Application filed September 24, 1914.  Serial No. 863,280.

*To all whom it may concern:*

Be it known that I, DANDRIDGE H. BIBB, a citizen of the United States, residing at New York city, county of New York, State of New York, have invented certain new and useful Improvements in Briquets and other Products Composed of Bonded Divided Material, of which the following is a full, clear, and exact description.

My invention relates to a new and improved cohering mass consisting of granular, powdered, fibrous, or any sub-divided material held together in a strong coherent mass by a water-resistant binder produced from the liquor commonly known as waste sulfite liquor, heretofore a waste product in the manufacture of chemical wood pulp. Compositions of matter produced by this binder are useful for many purposes; for example, they may be briquets of ore, flue dust or concentrate, bricks of sand or gravel, insulating or building materials of mica, asbestos or other fibrous minerals; or they be mixtures of the binder with fuel such as coal dust for fuel briquets. These compositions are characterized by strength and hardness, which, of course, varies with the nature of the granular, powdered, fibrous, material and the purpose to which it is to be applied, and by insolubility in water, being undisintegrated by moisture.

Many attempts have heretofore been made to utilize waste sulfite as a binder for briquets and to unite together various sub-divided materials into coherent masses either by adding other compounds to the liquor or by the agency of heat, or both, but they have been unsuccessful because the products on the one hand have been structurally weak, or else, having the necessary strength, they have been disintegrated by the action of moisture to such an extent as to render them practically useless. My products are characterized by strength, resistance to abrasion and a great degree of resistance to the action of water.

In making my products, I take granular, powdered, fibrous or other sub-divided material, which I include by the generic term "divided" and mix it thoroughly with the waste sulfite liquor; the sulfite liquor may be used either at its original density or it may be evaporated to any required density before it is mixed with the material to be bound together. If it is used in its original condition, the mixture may be heated to a low temperature to evaporate a part of the water in it while on the surface of the material to be bound together. Having obtained a suitable mixture, I press it into any required shape and heat the forms by exposing them for a short time to a temperature of, preferably, about 600° F. By exposure to this temperature the residue of waste sulfite liquor is converted into a compound, insoluble in water, of great binding power, yielding products characterized as above described, the coherent masses being useful for many purposes such as those mentioned.

In making a briquet of flue dust I have found that a satisfactory product embodying my invention can be produced by taking an amount of the waste sulfite liquor, evaporated to a viscosity of about 30° or 32° Baumé, equal to from six (6) to eight (8) per cent. by weight of the flue dust, thoroughly mixing the flue dust and evaporated liquor in any suitable mixing apparatus, pressing portions thereof one after another into the shape of briquets, and then subjecting them to a temperature of about 600° Fahrenheit for a period of about twenty (20) minutes. This results in converting the residue of the sulfite liquor into a non-coked, water resistant substance and produces a completely formed and hardened water-resistant briquet of flue dust bound together by non-coked, water-resistant residue of sulfite process waste liquor, which briquets will stand a hard abrasion test and be capable of withstanding moisture and abrasion during transportation or storage. This is the preferred process for forming flue dust briquets embodying my invention, but as will be evident to those skilled in the art may be modified without departing from the spirit of my invention or the scope of the appended claims.

In briqueting divided material other than flue dust I proceed in a similar manner, varying the proportions of the binder from four (4) per cent. to ten (10) per cent. by weight according to the character of the resultant briquet desired, but preferably subjecting it to substantially the same heat treatment.

What I claim therefore and desire to secure by Letters Patent is,—

1. A cohering mass of compacted divided material held together by a binder consisting of a non-coked water-resistant residue of waste sulfite liquor.

2. A coherent mass of granular inorganic material held together by a binder consisting of a non-coked water-resistant residue of waste sulfite liquor.

3. A briquet comprising flue dust held together by a binder consisting of a non-coked water-resistant residue of waste sulfite liquor.

DANDRIDGE H. BIBB.

Witnesses:
H. B. BROWNELL,
HENDERSON F. HILL.

Copies of this patent may be obtained for five cents each, by addressing the "Commissioner of Patents, Washington, D. C."